US012654486B2

(12) United States Patent (10) Patent No.: US 12,654,486 B2
Vits et al. (45) Date of Patent: Jun. 16, 2026

(54) METHOD FOR PRODUCING A CAST VEHICLE WHEEL

(71) Applicant: Maxion Wheels Holding GmbH, Königswinter (DE)

(72) Inventors: Johan Vits, Ranst (BE); Diego Balduzzi, Leno Brescia (IT)

(73) Assignee: Maxion Wheels Holding GmbH, Königswinter (DE)

( * ) Notice: Subject to any disclaimer, the term of this patent is extended or adjusted under 35 U.S.C. 154(b) by 299 days.

(21) Appl. No.: 18/593,123

(22) Filed: Mar. 1, 2024

(65) Prior Publication Data

US 2025/0276543 A1 Sep. 4, 2025

(51) Int. Cl.
| | |
|---|---|
| *B60B 3/06* | (2006.01) |
| *B22D 25/02* | (2006.01) |
| *B60B 7/14* | (2006.01) |

(52) U.S. Cl.
CPC ............... *B60B 3/06* (2013.01); *B22D 25/02* (2013.01); *B60B 7/14* (2013.01); *B60B 2310/202* (2013.01); *B60B 2310/228* (2013.01)

(58) Field of Classification Search
CPC ........ B60B 2310/202; B60B 2310/228; B60B 3/06; B60B 7/004; B60B 7/0053; B22D 15/005; B22D 17/229; B22D 17/24; B22D 25/02; B22C 9/28
See application file for complete search history.

(56) References Cited

U.S. PATENT DOCUMENTS

| | | | | |
|---|---|---|---|---|
| 5,311,918 A | * | 5/1994 | Scott | B22C 9/28 |
| | | | | 164/63 |
| 5,381,852 A | * | 1/1995 | Schilling | B60B 3/06 |
| | | | | 164/28 |
| 6,186,218 B1 | * | 2/2001 | Prieto | B22C 9/28 |
| | | | | 164/339 |
| 6,364,425 B1 | * | 4/2002 | Marquis | B60B 3/06 |
| | | | | 301/65 |
| 6,401,797 B1 | * | 6/2002 | Nitz | B22D 15/005 |
| | | | | 164/122 |
| 11,471,934 B2 | * | 10/2022 | Groth | B60B 3/10 |
| 2018/0126452 A1 | * | 5/2018 | Gao | B22D 15/005 |
| 2022/0161316 A1 | * | 5/2022 | Groth | B60B 1/08 |

* cited by examiner

*Primary Examiner* — Tyler J Lee
(74) *Attorney, Agent, or Firm* — MacMillan, Sobanski & Todd, LLC

(57) ABSTRACT

A method of manufacturing a cast vehicle wheel including a wheel trim cover attached thereto. A removable first tool insert is installed into a mold assembly. The tool insert includes a mounting feature that communicates with a cavity of the mold assembly to form a mating feature in the wheel. A wheel trim cover is provided and is attached to the wheel at the mating feature via a coupler formed in the wheel trim cover such that the relative position of the coupler and the mating feature positions the wheel trim cover relative to the wheel in a first predetermined position. After casting, the positional dimensions of the mating feature of the wheel relative to the coupler of the wheel trim cover is evaluated to determine the positional accuracy of the mounting feature of the first tool insert. If necessary, secondary inserts with improved mating features are provided and exchanged.

21 Claims, 12 Drawing Sheets

FIG. 7          FIG. 8

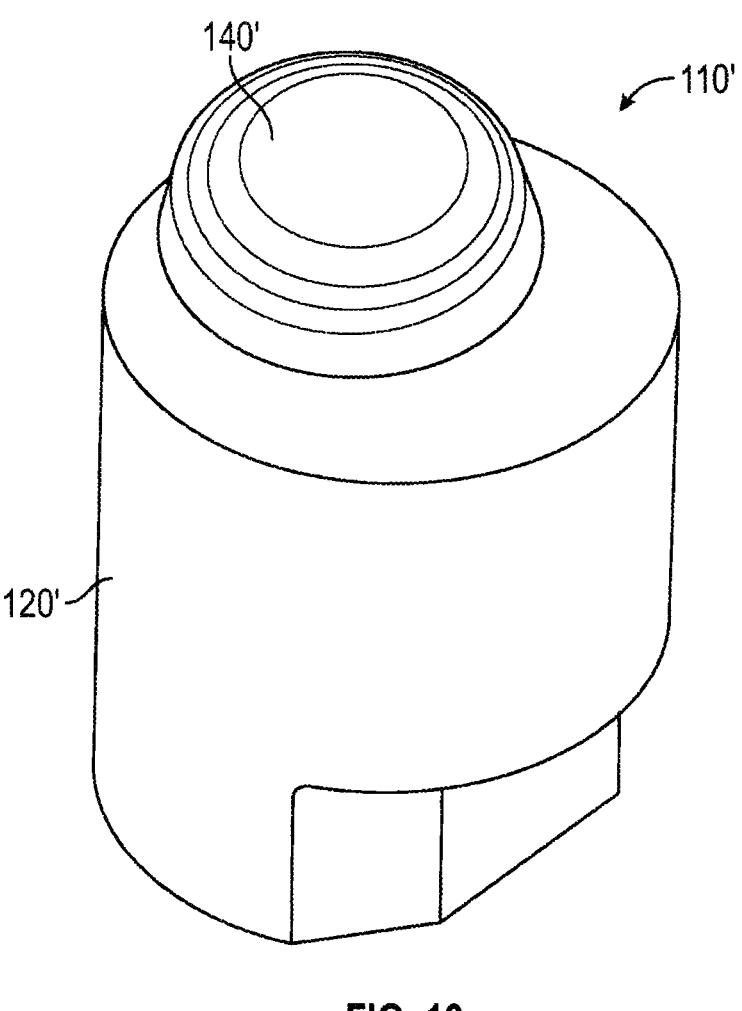
FIG. 10
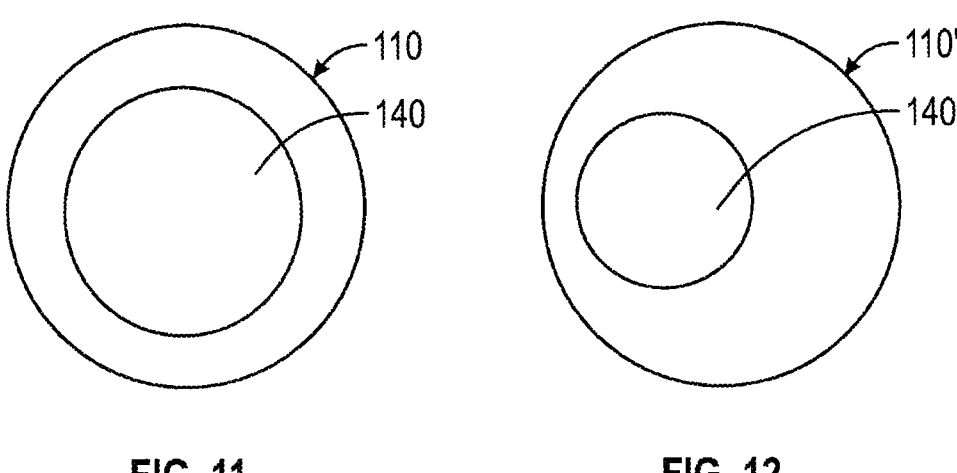
FIG. 11　　　　　　　　FIG. 12

METHOD FOR PRODUCING A CAST VEHICLE WHEEL

BACKGROUND OF THE INVENTION

The present invention relates in general to the production or manufacturing of a cast vehicle wheel, and in particular to an improved manufacturing process for producing a cast vehicle wheel having a plurality of wheel trim covers attached thereto.

Wheels for automotive vehicles may be produced by various methods. For example, the vehicle wheels may be produced within a mold assembly as a generally single cast component made from aluminum or alloys thereof. Some vehicle wheels may include additional trim panels or trim covers attached to the vehicle wheels post casting of the wheels. The trim covers may be provided for aesthetic reasons or for aerodynamic properties. These trim covers may be made of relatively lightweight plastic to reduce the overall weight of the wheel. The trim covers are typically fastened to the wheel such as by threaded fasteners.

The design and manufacture of the cast wheels may include integrally formed mating features to assist in the alignment, positioning and/or the centering of the trim covers relative to the wheel. The integrally formed mating features are adapted to receive corresponding mating features or couplers of the trim covers. The couplers formed on the trim covers provide an integral structural feature for properly positioning and joining the trim covers to the wheel. For example, the couplers may be in the form of protrusions integrally formed on the rear side of the trim covers which align with and mate with corresponding recesses formed on the front face of the wheel functioning as mating features of the wheel. Once properly positioned on the wheel, the trim covers may be more securely fastened to the wheel, such as by threaded fasteners.

Due to manufacturing tolerances of the cast wheel and/or the trim covers, the trim covers may not properly center or align properly with the wheel. To correct this issue, the mold assembly for the trim covers and/or the cast wheel may need to undergo additional tooling to correct the mating feature portions of the mold assembly. However, this additional tooling can be quite expensive and time-consuming resulting in delays and additional costs in the production of the wheels.

SUMMARY OF THE INVENTION

The present invention relates to an improved method for producing a cast vehicle wheel as illustrated and/or described herein.

According to one embodiment, the method for producing a cast vehicle wheel may comprise, individually and/or in combination, one or more of the following steps, features, elements, and/or advantages: a method of manufacturing a cast wheel including at least one wheel trim cover attached thereto, wherein the method comprises the steps of: (a) providing a wheel mold assembly having a cavity defining the shape of the wheel; (b) providing a removable first tool insert adapted to be installed into the mold assembly, wherein the first tool insert includes a mounting feature that communicates with the cavity of the mold assembly to form a mating feature in the wheel when the wheel is cast; (c) installing the first tool insert into the mold cavity; (d) casting the wheel by introducing a casting material into the cavity of the mold assembly, thereby forming the mating feature in the wheel; (e) removing the wheel from the mold assembly; (f)

providing at least one wheel trim cover adapted to be attached to the wheel at the mating feature of the wheel via a coupler formed in the wheel trim cover such that the relative position of the coupler and the mating feature positions the wheel trim cover relative to the wheel in a first predetermined position; (g) attaching the wheel trim cover onto the wheel at the location of the coupler and the mating feature; (h) evaluating the positional dimensions of the mating feature of the wheel relative to the coupler of the wheel trim cover to determine the positional accuracy of the mounting feature of the first tool insert; (i) subsequent to step (h), providing a second tool insert having a second mounting feature dimensionally different from the mounting feature of the first tool insert which provides improved positional accuracy of the wheel trim cover relative to the wheel in a second predetermined position; (j) replacing the first tool insert from the mold cavity and installing the second tool insert into the mold assembly; (k) casting a second wheel by introducing a casting material into the cavity of the mold assembly; and (l) attaching the wheel trim cover onto the second wheel at the location of the coupler and the second mating feature.

According to this embodiment, the coupler of the wheel trim cover is in the form of a protrusion, and wherein the mating feature of the wheel is a recess receiving the protrusion when the wheel trim cover is attached to the wheel.

According to this embodiment, in step (d) during the casting process, the formation of the profile of the mating feature of the wheel corresponds to the profile of the mounting feature of the first tool insert.

According to this embodiment, in step (g) the wheel trim cover is attached onto the wheel by at least one fastener.

According to this embodiment, the fastener is a threaded bolt.

According to this embodiment, wherein prior to step (g) a hole is formed in the wheel at the mating feature of the wheel for receiving the threaded bolt.

According to this embodiment, the hole is formed by a machining or drilling process after the wheel is cast.

According to this embodiment, the hole is formed in the casting process.

According to this embodiment, the wheel trim cover is provided with internal threads formed therein for receiving the threaded bolt.

According to this embodiment, the coupler of the wheel trim cover is provided with the internal threads.

According to this embodiment, the coupler is a protrusion formed in the wheel trim cover.

According to this embodiment, the mating feature of the wheel is a recess receiving the protrusion of the wheel trim cover.

According to this embodiment, the protrusion is cylindrically shaped.

According to this embodiment, the recess is cylindrically shaped.

According to this embodiment, in step (l) the wheel trim cover is attached onto the second wheel by at least one fastener.

According to this embodiment, in step (h), evaluating the positional dimensions of the mating feature of the wheel relative to the coupler of the wheel trim cover includes measuring the position of the mating feature of the wheel relative to the position of the coupler of the wheel trim cover.

According to this embodiment, the tool insert includes a keyway which mates with a key portion of the mold assembly to prevent rotation of the tool insert within the mold assembly.

According to this embodiment, the coupler of the wheel trim cover includes a distal surface, and wherein the distal surface contacts the wheel when the wheel trim cover is attached to the wheel.

According to this embodiment, the coupler of the wheel trim cover includes a distal end, and wherein the distal end is spaced from the wheel when the wheel trim cover is attached to the wheel.

According to this embodiment, the wheel mold assembly includes:

a first portion having a profile defining a front facing disc portion of the wheel; a second portion having a profile defining a rear facing disc portion of the wheel; and a plurality of side portions having a profile defining a rim portion of the wheel.

Various aspects of this invention will become apparent to those skilled in the art from the following detailed description of the preferred embodiments, when read in light of the accompanying drawings.

BRIEF DESCRIPTION OF THE DRAWINGS

FIG. 7 is an enlarged top front perspective view of a tool insert used in the mold assembly of FIG. 6.

FIG. 8 is bottom perspective view of the tool insert of FIG. 7.

FIG. 10 is an enlarged top front perspective view of an alternate embodiment of a tool insert.

FIG. 11 is a schematic top view of an alternate embodiment of a tool insert.

FIG. 12 is a schematic top view of an alternate embodiment of a tool insert.

DETAILED DESCRIPTION OF THE PREFERRED EMBODIMENTS

Figure 1:
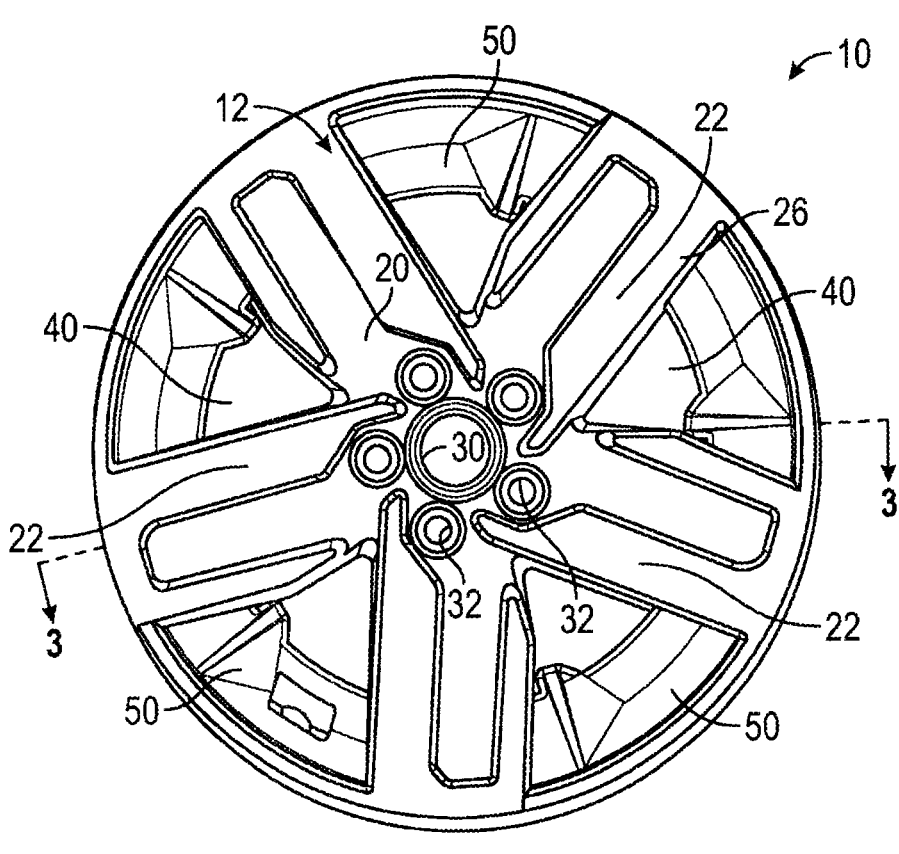
FIG. 1 is a front elevational view of a cast vehicle wheel having a plurality of trim covers attached thereto and produced in accordance with the present invention.

Referring now to the drawings, there is illustrated in FIG. 1 a vehicle wheel, indicated generally at 10. The wheel 10 generally defines a wheel disc, indicated generally at 12, and an outer annular rim, indicated generally at 14 (see FIGS. 3 and 4). Although the invention is illustrated and described in conjunction with the particular vehicle wheel construction disclosed herein, it will be appreciated that the invention can be used in conjunction with other types of vehicle wheel constructions.

In a preferred embodiment (and as illustrated herein), the wheel disc 12 and the rim 14 are unitarily or monolithically produced, such as for example, as a single casting. After production of the casting, portions of the casting can be machined or otherwise worked to form the wheel 10. Alternatively, the wheel disc 12 and rim 14 may be produced separately, such as separate castings and/or non-castings, and then joined together by any suitable means, to produce a "fabricated" vehicle wheel 10. In this fabricated example, the wheel disc 12 is preferably produced as a single casting.

The wheel 10 can be produced or cast from any suitable material. For example, the wheel 10 may be in all-cast wheel design formed from aluminum or alloys thereof. Aluminum is advantageous in that it is relatively inexpensive, lightweight, easily machinable, and can provide sufficient rigidity. Other suitable materials in which the wheel 10 can be made of include magnesium, titanium or alloys thereof, steel, carbon fiber and/or composite materials.

Figure 3:
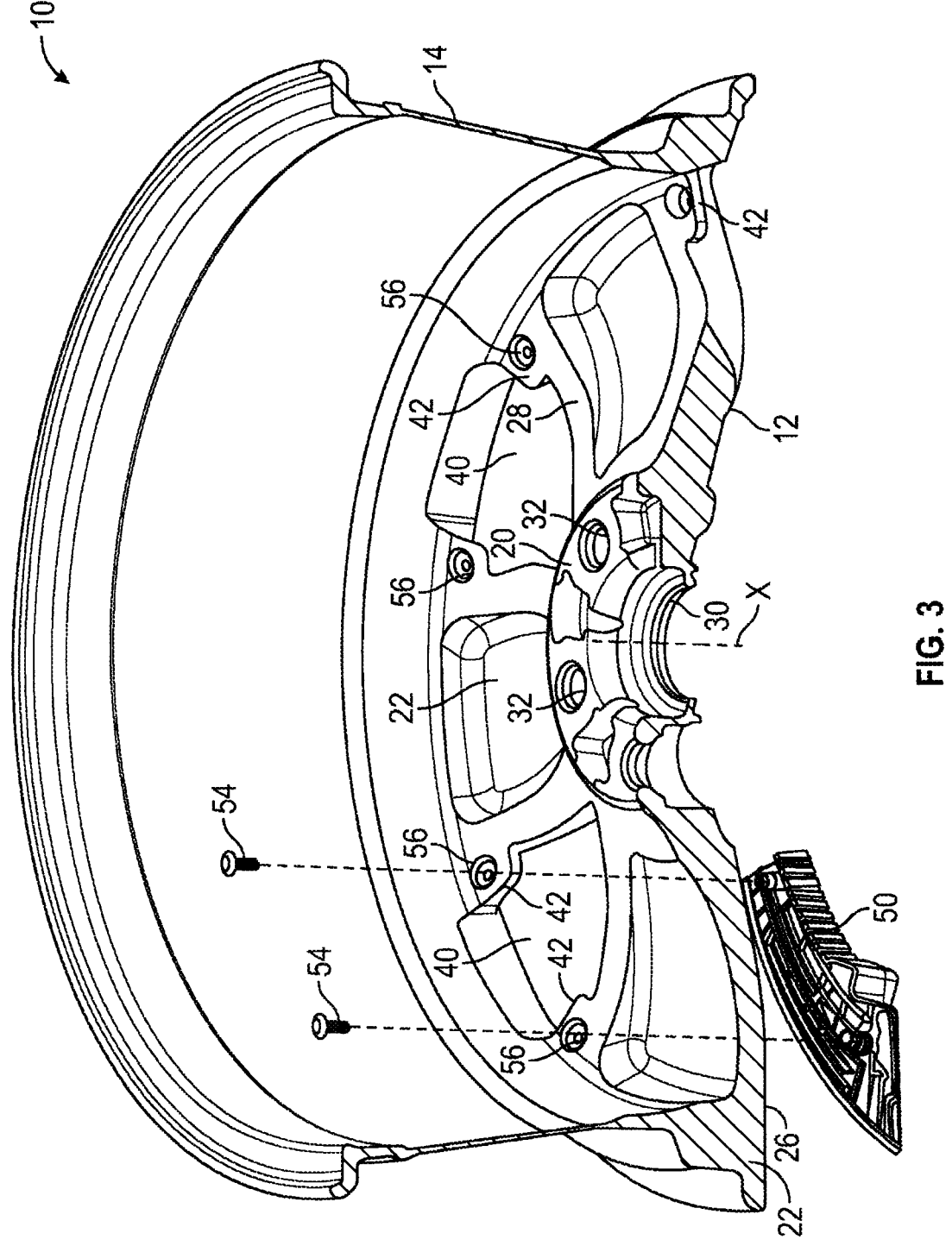
FIG. 3 is a perspective sectional view of the wheel taken along lines 3-3 in FIG. 1 illustrating a trim cover separated from the wheel.
Figure 4:
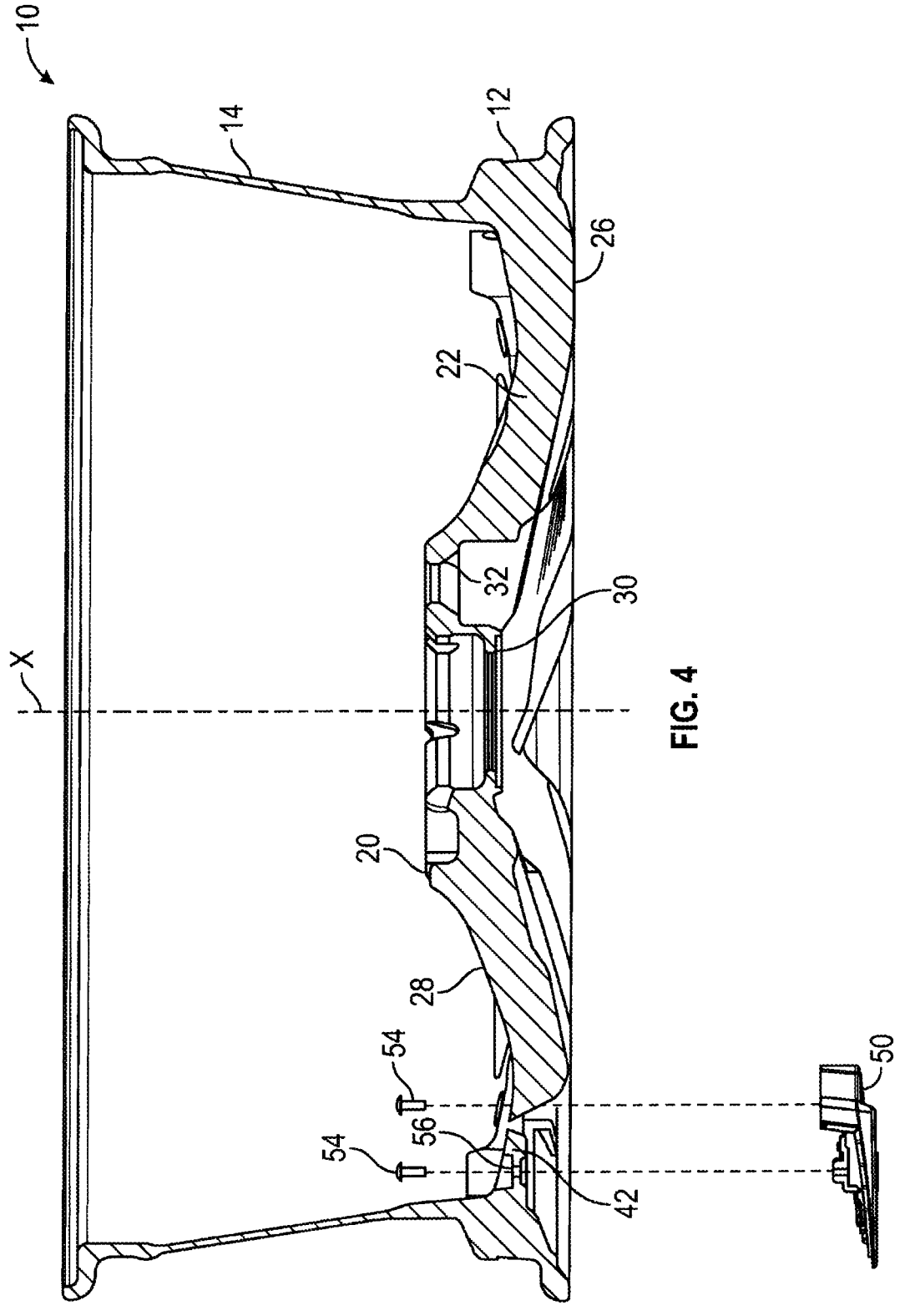
FIG. 4 is a sectional view of the wheel taken along lines 4-4 in FIG. 2 illustrating a trim cover separated from the wheel.

As shown in FIGS. 3 and 4, the combination of the wheel disc 12 and the outer rim 14 defines a wheel axis X for the wheel 10. The outer rim 14 can have any suitable shape for receiving and supporting a tire (not shown). In one embodiment, the outer rim 14 is machined after the wheel 10 is cast to provide a continuous annular shape relative to the wheel axis X for accommodating the tire. It should be appreciated that the outer rim 14 can have any desired diameter and/or shape.

The wheel disc 12 is generally comprised of a central hub 20 and a plurality of spokes 22 extending radially outwardly from the hub 20. As stated previously, it is preferred that the wheel disc 12 is a single cast component such that the hub 20 and the spokes 22 are all formed together as a single cast.

Figure 2:
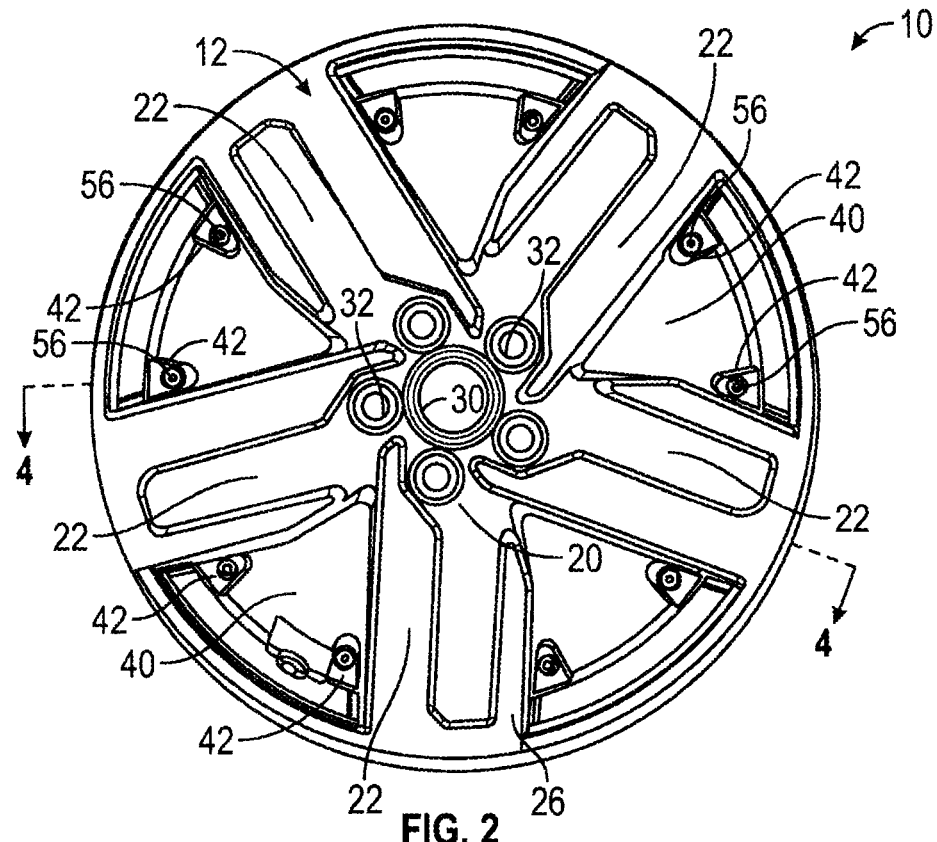
FIG. 2 is a front elevational view of the wheel of FIG. 1 showing the trim covers of the wheel removed.

The hub 20 is generally defined as a plate or disc defining a front face 26 (or front surface), as seen in FIGS. 1, 2, and 4, and a rear face 28 (or rear surface), as seen in FIGS. 3 and 4. The front face 26 is located on the outboard side of the wheel 10 when mounted on a vehicle. The rear face 28 is located on the inboard side of the wheel 10 when mounted on a vehicle. The hub 20 functions as a wheel mounting portion or center mounting portion of the wheel 10 for connecting with an axle (not shown) via a plurality of lug bolts (not shown) and lug nuts (not shown).

The hub 20 includes a centrally located pilot aperture or hub hole 30. The hub hole 30 generally extends along the wheel axis X. The hub hole 30 may accommodate a portion of the axle and/or receive a protective/decorative cap (not shown). A plurality of lug bolt receiving holes 32 are circumferentially spaced around the hub hole 30 and wheel axis X. In the illustrated embodiment, the hub 20 includes five lug bolt receiving holes 32. Alternatively, the number and/or location of the lug bolt receiving holes 32 may be other than illustrated if so desired. The lug bolt receiving holes 32 receive the lug bolts for securing the vehicle wheel 10 with lug nuts on the axle of an associated vehicle.

In the illustrated embodiment, the wheel disc 12 includes five relatively wide spokes 22 extending from the hub 20. Alternatively, the number of the spokes 22 may be other than illustrated if so desired. For example, the vehicle wheel 10 may include less than five spokes 22 or more than five spokes 22. The spokes 22 may have any suitable shape and/or decorative features formed therein, as shown in FIGS. 1 and 2.

The wheel disc 12 further defines a plurality of vent holes 40 generally located between the spokes 22. The vent holes 40 may have any suitable shape, such as a generally V-shape as shown in the figures. In the illustrated embodiment, the wheel disc 12 includes five vent holes 40 generally corresponding to the five spokes 22. The wheel disc 12 further includes a plurality of flanges 42 generally located in the region of the vent holes 40 and extend from distal ends of the spokes 22. In the illustrated embodiment, the wheel disc 12 includes ten flanges 42 in total such that a pair of flanges 42 are arranged in each region of the vent holes 40. As will be discussed in detail below, each of the flanges 42 includes a mating feature formed therein for the attachment and positioning of a plurality of wheel trim covers 50. It should be understood that the flanges 42 are not absolutely required and that the wheel 10 could be designed without the flanges 42 such that the mating features could be directly formed alternatively in other parts of the wheel 10, such as in the spokes 22 or the hub 20.

The wheel disc 12 includes the plurality of trim covers 50 that are attached to the wheel disc 12 after casting of the wheel 10. In a preferred embodiment, the trim covers 50 are attached to the wheel disc 12 at radially outward portions of the vent holes 40, as best shown in FIG. 1. Note that the wheel 10 illustrated in FIG. 2 does not show any trim covers 50 attached thereto. Of course, the trim covers 50 can have any suitable shape and may be mounted in other suitable locations on the wheel disc 12 other than as illustrated. In the illustrated embodiment, the wheel disc 12 includes five trim covers 50 generally corresponding to the number of vent holes 40 and spokes 22. Instead of having a plurality of trim covers 50, it should be understood that a single trim cover may be utilized, as will be explained below with respect to FIGS. 16 through 20.

In a preferred embodiment, the trim covers 50 are made of a generally lightweight plastic material. The trim covers 50 may be simply added to the wheel 10 to provide an aesthetically pleasing appearance. Alternatively, or in addition to, the trim covers 50 may provide for an aerodynamic enhanced characteristic of the wheel 10. The trim covers 50 may provide for a more "bulkier" appearance without adding much additional weight to the wheel 10 compared to providing casted metal material in the same region of the wheel disc 12. The trim covers 50 may have a color different from the color of the wheel 10, or may have a similar color as to blend in aesthetically.

As stated above, the trim covers 50 may have any suitable shape. In the illustrated embodiment, the trim covers 50 have a somewhat flattened slightly arcuate shape that extends between distal ends of adjacent spokes 22. As best shown in FIG. 3, the trim covers 50 can have any suitably shaped ridges to provide rigidity to the trim covers 50. Each of the trim covers 50 is attached to the wheel disc 12 by two threaded fasteners or bolts 54. The bolts 54 may be a bolt, a fastener or a self-tapping screw, for example. Of course, the trim covers 50 may be attached to the wheel disc 12 by a single bolt 54 or more than two bolts (see the embodiment illustrated in FIG. 15). Alternatively, the trim covers 50 may be attached to the wheel disc 12 by fasteners (not shown) other than the bolts 54, such as by rivets, clips, or adhesive. As discussed below, during attachment of the trim covers 50, the bolts 54 are received in bores or pass through bolt holes 56 formed in the flanges 42. The bolt holes 56 may be formed from a machining or drilling operation after the wheel 10 has been cast. Alternatively, the bolt holes 56 may be formed from integral features of a mold assembly used to cast the wheel 10

Figure 5:
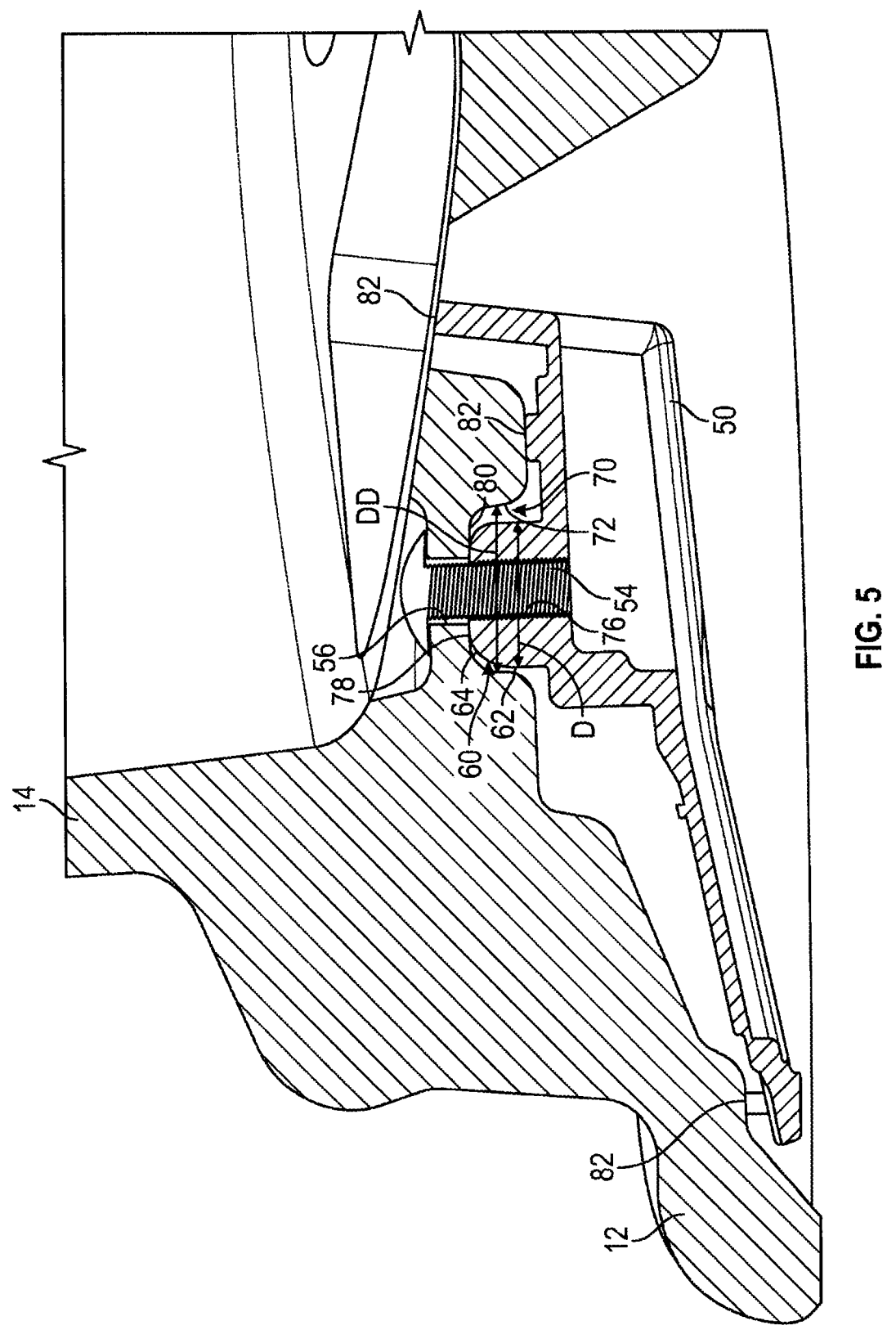
FIG. 5 is an enlarged sectional view of a portion of the wheel of FIG. 4 with the trim cover attached to the wheel.

Referring to FIG. 5, a more detailed illustration of a portion of a trim cover 50 is provided. As stated above, each trim cover 50 is attached to the wheel disc 12 at two locations, indicated generally and defined as mating features, indicated generally at 60. One such location is shown in the sectional drawing of FIG. 5. The mating feature 60, as shown in the illustrated embodiment, is in the form a coupler 62. The coupler 62 may be provided as a bulge, mound or protuberance extending rearwardly (upwardly as viewing FIG. 5) from the trim cover 50. The coupler 62 may have a cylindrical shape defining a diameter D. Of course, the coupler 62 may have any suitable shape. In the illustrated embodiment, the coupler 62 includes a rounded end 64. Of course, the end 64 need not be rounded and/or may include a chamfer instead.

As will be discussed in detail below, the couplers 62 of the trim covers 50 provide means for centering or aligning the trim cover 50 relative to the wheel disc 12 when the trim covers 50 are attached to the wheel disc 12. The couplers 62 are received in corresponding mating features, indicated generally at 70, of the wheel disc 12. More specifically, in the illustrated embodiment shown in FIG. 5, the mating features 70 of the wheel disc 12 are in the form of holes or recesses 72 formed in the flanges 42. The recesses 72 may be through holes or non-through hole bores formed in the flanges 42. The recesses 72 may have a cylindrical shape generally corresponding to the shape and profile of the couplers 62. In the illustrated embodiment, the recesses 72 have a diameter DD. The diameter DD of the recesses 72 may be relatively the same size of the diameter D of the corresponding couplers 62. The diameter D may be slightly greater than the diameter DD such that a frictional fit is created when a coupler 62 is inserted into a corresponding recess 72. Alternatively, the diameter D may be slightly smaller than the diameter DD such that a slight cylindrical gap may exist between the walls of the couplers 62 and the recesses 72, such as shown in FIG. 5. Note that this gap is shown highly exaggerated in the drawing of FIG. 5 for clarity purposes and is not representative of the actual gap size. As is also shown in FIG. 5, the gap between the walls of the couplers 62 and the recesses 72 may be slightly non-symmetrical such that the couplers 62 are not completely centered within the corresponding recesses 72. This misalignment may be caused when the bolt 54 is threaded into a threaded bore 76 formed in the corresponding coupler 62 during attachment of the trim cover 50 to the wheel disc 12.

To attach a trim cover 50 to a corresponding portion of the wheel disc 12, the trim cover 50 is positioned such that coupler 62 is inserted into the corresponding recess 72. Note that for each of the trim covers 50, two couplers 62 are placed with a corresponding pair of recesses 72. Note that a distal end 78 of the coupler 62 may contact a bottom surface 80 of a corresponding recess 72, as shown in FIG. 5. Alternatively, a small gap may exist between the distal end 78 and the bottom surface 80 such that the distal end 78 is spaced from the bottom surface 80. Also note that other various structures 82 of the trim cover 50 may contact and engage with portions of the wheel disc 12. Alternatively, the various structures 82 may be designed such that there is no contact to reduce rattling, for example. Once the coupler 62 is positioned within the corresponding recess 72, one of the bolts 54 may be inserted through the corresponding bolt hole 56 of the flange 42 and then threaded into the threaded bore 76 of the coupler 62, thereby fastening the trim cover 50 to the wheel disc 12. Alternatively, self-tapping screws (not shown) may be utilized. For example, there could be a lack of a threaded bore 76 and the bolts 54 may be replaced with self-tapping screws or bolts which are inserted into the trim cover 50. In this case, the thread may be made when the self-tapping screw is used for the first time.

As will be discussed below, slight manufacturing tolerances in the casting wheel 10 and/or the formation of the trim cover 50 may provide for a slight misalignment of the trim cover 50 from a desired first predetermined position relative to the wheel disc 12. As will be discussed in detail below, a method of manufacturing the wheel 10 in accordance with the present invention will assist in adjusting/correcting this misalignment in a low-cost manner.

Figure 6:
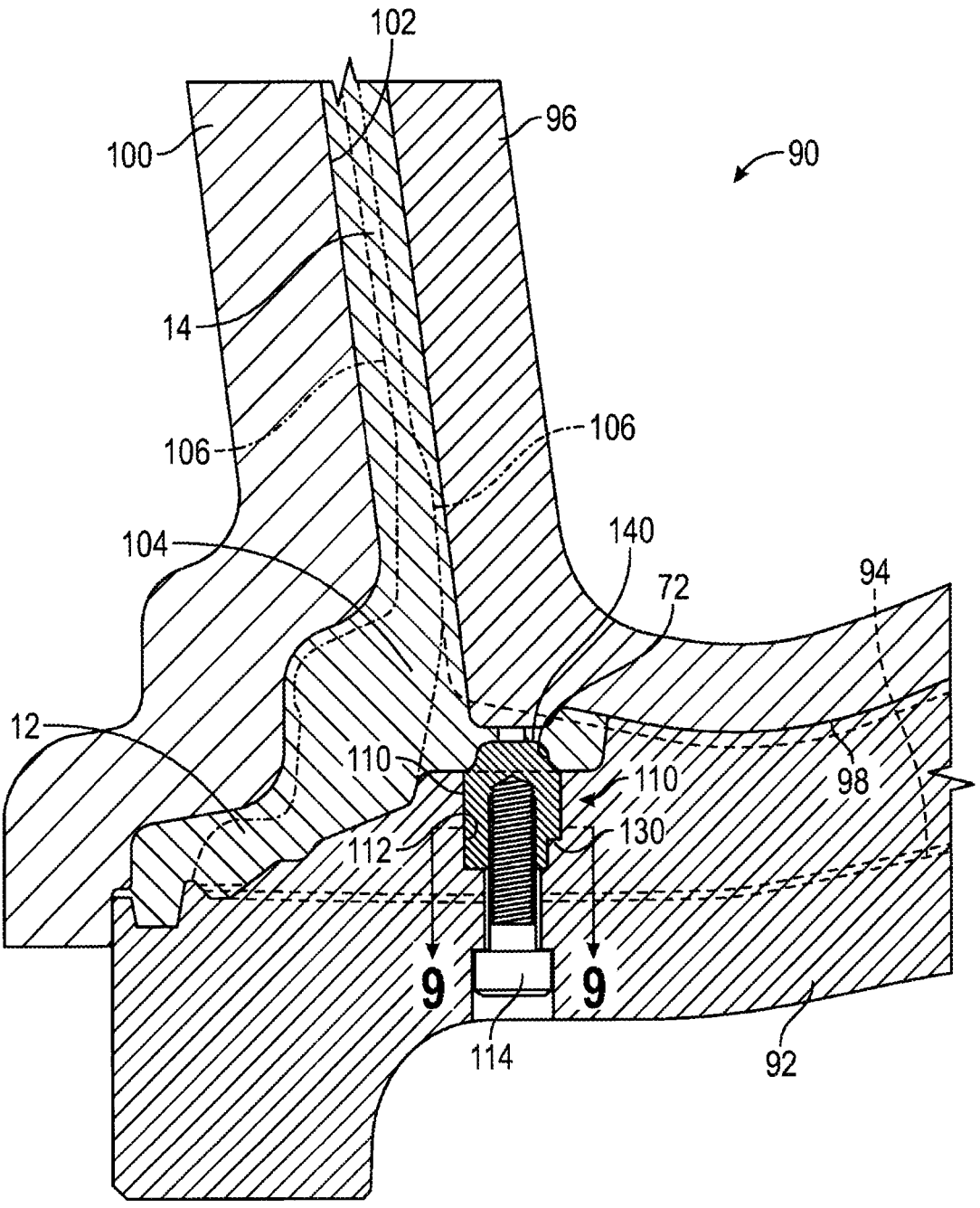
FIG. 6 is a partial cross-sectional view of a mold assembly having a tool insert illustrating the casting process for forming the wheel.
Figure 9:
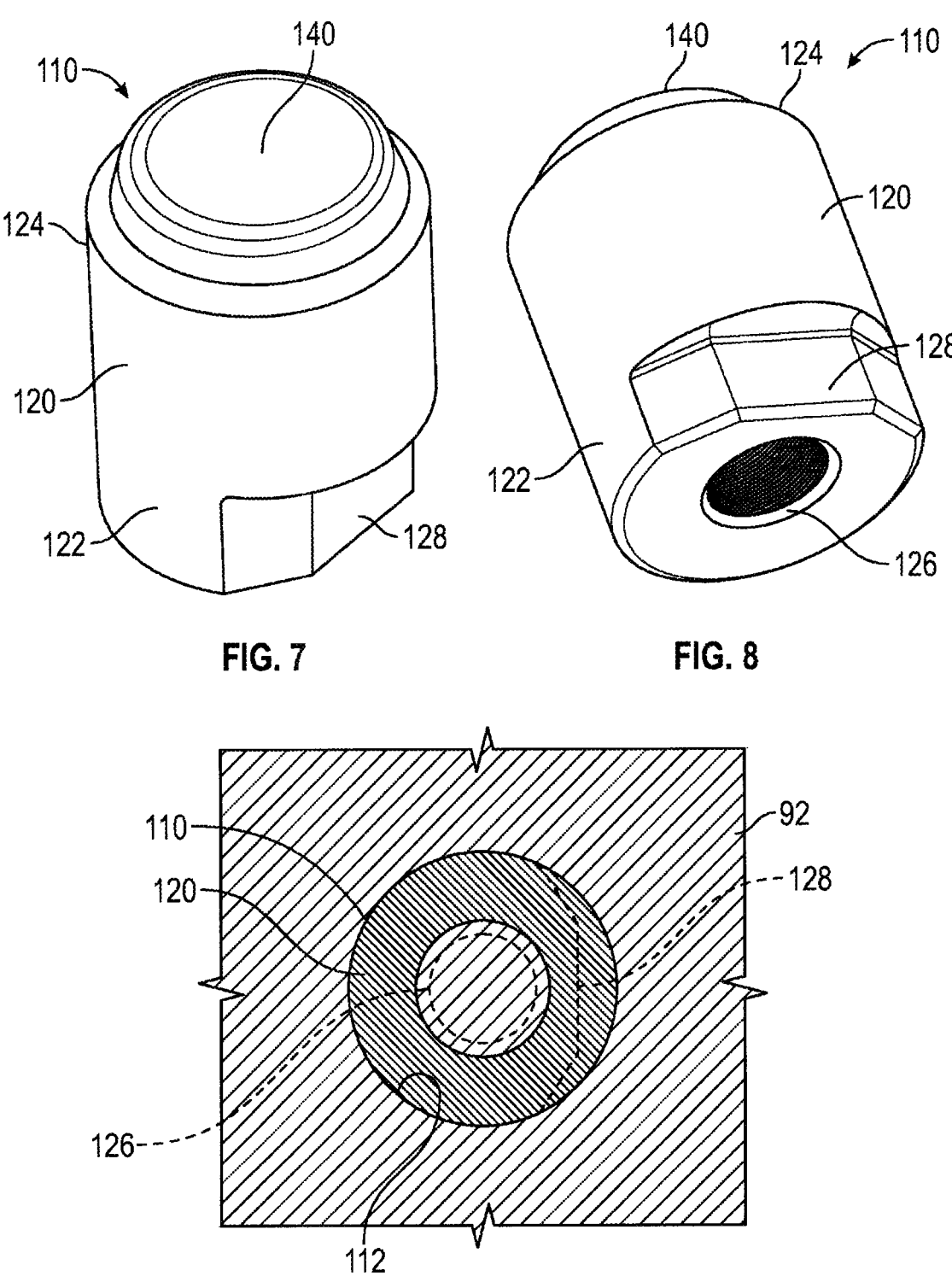
FIG. 9 is a partial cross-sectional view of the mold assembly and tool insert taken along lines 9-9 in FIG. 6.

Referring now to FIG. 6, a preferred method of manufacturing the wheel 10 will now be described. FIG. 6 illustrates a portion of a mold assembly, indicated generally at 90, for use in casting the wheel 10. The section of FIG. 6 is generally taken through the portion of the cast wheel 10 around one of the flanges 42. The wheel 10 may be cast in any suitable manner and it should be understood that the method described herein with respect to the mold assembly 90 is just one suitable method for producing the wheel 10. The mold assembly 90 includes a first portion 92 having a surface 94 with a profile that generally corresponds to the front face 26 of the wheel disc 12 of the wheel 10. The mold assembly 90 further includes a second portion 96 having a surface 98 with a profile that generally corresponds to the rear face 28 of the wheel disc 12 of the wheel 10. The surface 98 may also extend (upward as viewing FIG. 6) such that it corresponds with an inner portion of the rim 14. The mold assembly 90 further includes one or more side portions 100 having surfaces 102 with a profile that generally corresponds to the outer portion of the rim 14. When the mold assembly 90 is in a closed position, as shown in FIG. 6, the first, second, and side portions 92, 96, and 100 form a cavity 104 generally defining the shape of the wheel 10. Note that in FIG. 6, the cavity 104 is shown filled with a cast material. It is also noted that a plurality of broken or phantom lines 106 represent the final shape of the wheel 10 after a machining process is subsequently performed to the casting of the wheel 10 to provide the desired and smoothed shape of the wheel 10.

In accordance with a preferred embodiment of the present invention, the mold assembly 90 includes a plurality of removable tool inserts, indicated generally at 110. The inserts 110 are positioned within the mold assembly 90 and utilized to form the recesses 72 in the flanges 42 of the wheel disc 12. As will be discussed further below, differently shaped removable inserts 110 (such as shown in FIG. 10) can be replaced and exchanged within the mold assembly 90 to alter the formation of the corresponding recesses 72 to change the desired size, shape and location of the recesses 72. Note that only one insert 110 is shown in the sectional drawing of FIG. 6. Preferably, ten inserts 110 are used within the mold assembly 90 corresponding to the ten recesses 72 of the wheel disc 12. The inserts 110 are disposed within bores 112 formed in the first portion 92 of the mold assembly

90. The bores 112 may be multi-stepped bores for accommodating the inserts 110 as well as the mounting bolts 114. The mounting bolts 114 secure the inserts 110 within the first portion 92 of the mold assembly 90. Of course, other means for securing the inserts 110 may be used other than the mounting bolts 114.

Referring now to FIGS. 7 and 8, an initial or first tool insert 110 is shown in greater detail. The insert 110 includes a cylindrically shaped main body 120. The body 120 defines a proximal end 122 and a distal end 124. A threaded bore 126 is formed in the proximal end 122 of the insert 110. The threaded bore 126 receives a corresponding mounting bolt 114 to secure the insert 110 within the first portion 92 of the mold assembly 90. The threaded bore 126 may be axially centered within the cylindrical main body 120.

In a preferred embodiment, the insert 110 does not rotate within the corresponding bore 112 formed in the first portion 92 of the mold assembly once the insert 110 is mounted therein. This non-rotational mounting may be provided by any suitable manner. For example, as shown in FIGS. 7 and 8, the insert 110 may be provided with a keyway or notch 128 formed in the proximal end 122 thereof. The keyway 128 interacts with a ledge 130 (see FIG. 6) radially inwardly formed within the bore 112, thereby preventing rotation of the insert 110 when the insert 110 is installed into the bore 112. Although the notch 128 is illustrated with three surfaces, it should be understood that it may be made more simply with a single surface, or alternatively may have any suitable shape that interacts with the ledge 130 to prevent rotation.

Located at the distal end 124 of the insert 110 is a mounting feature provided in the form or a dome or protrusion 140. The protrusion 140 communicates with and extends into the cavity 104 of the mold assembly 90 when the insert 110 is mounted within the bore 112, as shown in FIG. 6. The shape and size of the protrusion 140 corresponds to the shape and size of the recess 72 formed in the casted wheel disc 12. Thus, the protrusion 140 creates the recess 72 when the wheel 10 is cast within the mold assembly 90. Of course, the physical attributes of the protrusion 140 and the recess 72 may be switched such that the insert 110 has a recess which receives a protrusion formed in the wheel disc 12.

Figures 13, 14:
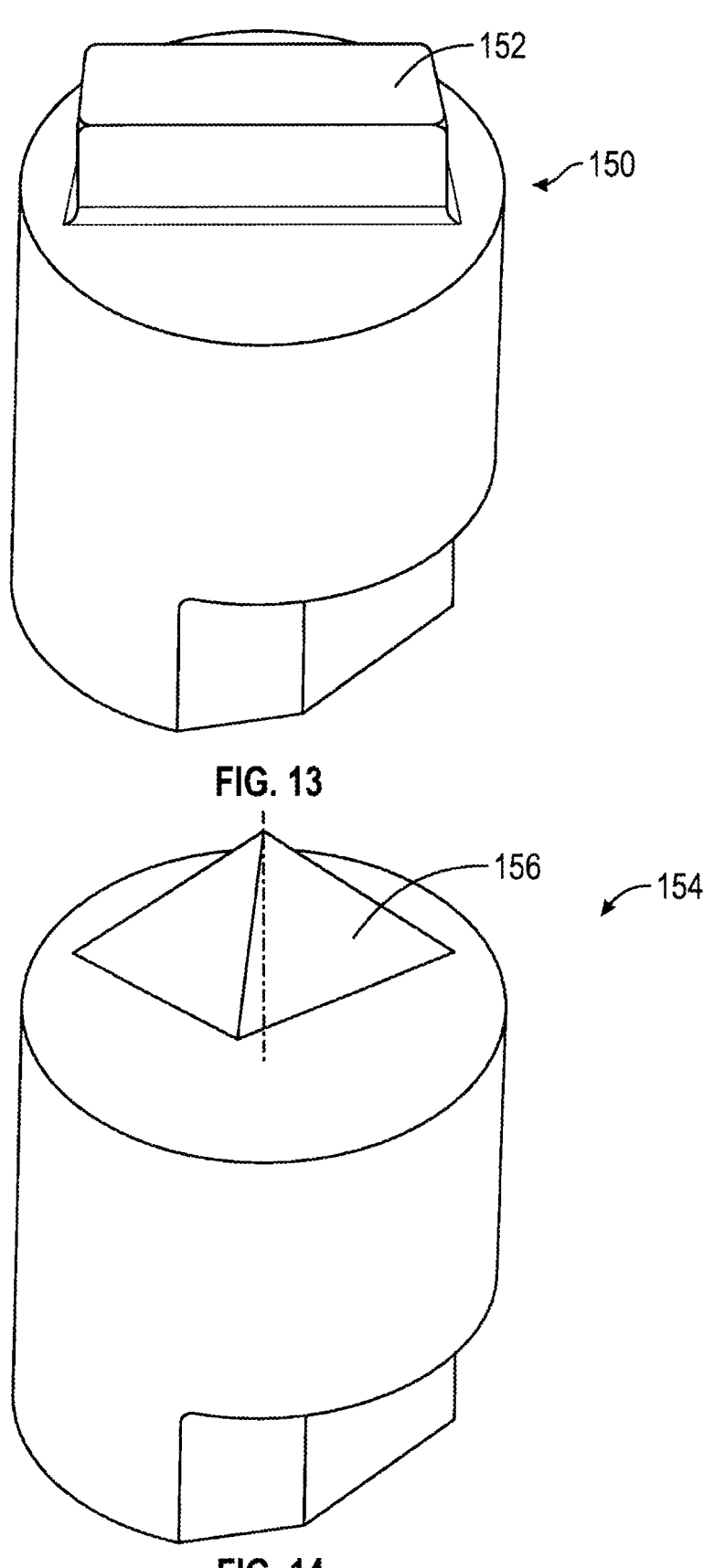
FIG. 13 is an enlarged top perspective view of an alternate embodiment of a tool insert.
FIG. 14 is an enlarged top perspective view of an alternate embodiment of a tool insert.

The protrusion 140 can have any suitable shape. For example, in the embodiment shown in FIGS. 6 through 8, the protrusion 140 has a cylindrical shape corresponding to the shape of the recess 72. The shape of the recess 72 corresponds to shape of the coupler 62 of the trim cover 50 when the trim cover 50 is mounted on the wheel disc 12. The protrusions 140, the recesses 72, and the couplers 62 can have any corresponding shape and need not be cylindrical. For example, they may each have a frustoconical shape. In another example, there is illustrated in FIG. 13 and alternate embodiment of an insert 150 including a protrusion 152 having a rectangular block shape. Accordingly, the insert 150 would be used with a trim cover 50 having a coupler with a corresponding rectangular block shape. There is illustrated in FIG. 14 of yet another alternate embodiment of an insert 154 including a protrusion 156 having a triangular or pyramidal shape.

The preferred method of manufacturing the wheel 10 will now be discussed. A plurality of trim covers 50 is provided having a desired shape such as the shape of the trim covers 50 illustrated in the figures. In general, the trim covers 50 have been manufactured, such as by a suitable plastic forming process, and will generally not be replaced or remanufactured to a different specification. However, it should be understood that due to changing manufacturing tolerances in the production of the trim covers 50, the final size and shape of the trim covers 50 may vary slightly from the initially designed size and shape.

A first set of initially designed tool inserts 110 are installed into the wheel mold assembly 90. More precisely, ten first tool inserts 110 are installed into the corresponding ten bores 112 of the first portion 92 of mold assembly 90. These initially designed first tool inserts 110 may have the general shape as the inserts 110 illustrated herein. Once installed, the protrusions 140 of the inserts 110 will be introduced within the cavity 104 of the mold assembly 90. The mold assembly 90 is closed and casting material is introduced into the cavity 104 of the mold assembly 90, such as is shown in FIG. 6. During the casting process, recesses 72 will be formed in accordance with the shape, size and profile of the protrusions 140 of the inserts 110.

The wheel 10 is then removed from the mold assembly 90. The trim covers 50 are then optionally installed onto the wheel 10 such that the couplers 62 of the trim covers 50 are inserted into corresponding formed recesses 72 of the wheel disc 12. The trim covers 50 should be properly positioned relative to the wheel disc 12 in a first predetermined position per the initially designed configuration. The position of the trim covers 50 is then evaluated and measured to determine if the trim covers 50 are, in fact, within the desired first predetermined designed position. If it is determined that the trim covers 50 are not properly positioned within acceptable specifications, the initially formed wheel 10 may be discarded. Secondary tool inserts 110', such as is shown schematically in FIG. 10, are then provided to replace the initially designed first tool inserts 110 for correcting any misalignment that may have occurred. The secondary inserts 110' are designed such that newly designed protrusions 140' are provided for producing differently positioned and/or sized recesses 72' in a secondary formed wheel 10'. It is noted that the differently shaped protrusion 140' of the secondary insert 110 illustrated in FIG. 10 is highly exaggerated for clarity purposes and that in reality, only minor changes will generally be required. As shown schematically in FIG. 10, the protrusion 140' may be designed larger or smaller and/or offset relative to the cylindrical main body 120'. FIG. 11 is a schematic illustration of a top view of the first initially designed insert 110 showing the protrusion 140 being generally axially aligned therewith. FIG. 12 is a highly exaggerated schematic illustration of the secondary designed inserts 110' having a protrusion 140' designed smaller and offset to manage the minor misalignment issues of the installed placement of the trim covers 50 relative to the wheel disc 10.

The first tool inserts 110 are exchanged with the newly designed and formed secondary inserts 110' within the first portion 92 of the mold assembly 90. The protrusions 140' of the new inserts 140' will be designed to take into consideration the misalignment determined in the evaluation and measuring step as described above. A second wheel is cast within the mold assembly 90 and trim covers 50 are installed thereon. The wheel 10 may then be reevaluated and measured to confirm that the proper placement of the trim covers 50 relative to the wheel are accurate and are within a second predetermined position. Thus, the use of the secondary exchanged tool inserts 110' assist to improve the centering and positioning of the trim covers 50, thereby avoiding a costly procedure of re-machining, retooling, or replacing portions of the mold assembly 90. The use of the secondary exchanged tool inserts 110' described above may also avoid costly changeover expenses. The wheels 10 may have variations caused by differences in material shrinkage behavior or by mold wear, and thus, the secondary exchanged tool inserts 110' could be also be utilized for mold wear reasons.

It should be understood that installing the trim covers 50 onto the wheel 10 prior to evaluating the positional dimensions and determining the positional accuracy of the mounting feature of the first tool inserts 100 is not required and is an optional step. The evaluation may be determined even if the trim covers 50 are not installed onto the wheel 10. Evaluation of the positional dimensions may be done with the assistance of a coordinate measuring machine (CMM) (not shown), which is well known in the industry. A CMM is typically a device that measures the geometry of physical objects by sensing discrete points on the surface of the object with a probe. The machine generally specifies the position of the probe in terms of displacement from an origin point in a three-dimensional coordinate system (XYZ axes). Various types of probes may be used with the CMM, such as for example, mechanical, laser, other optical and white light sensors.

Figure 15:
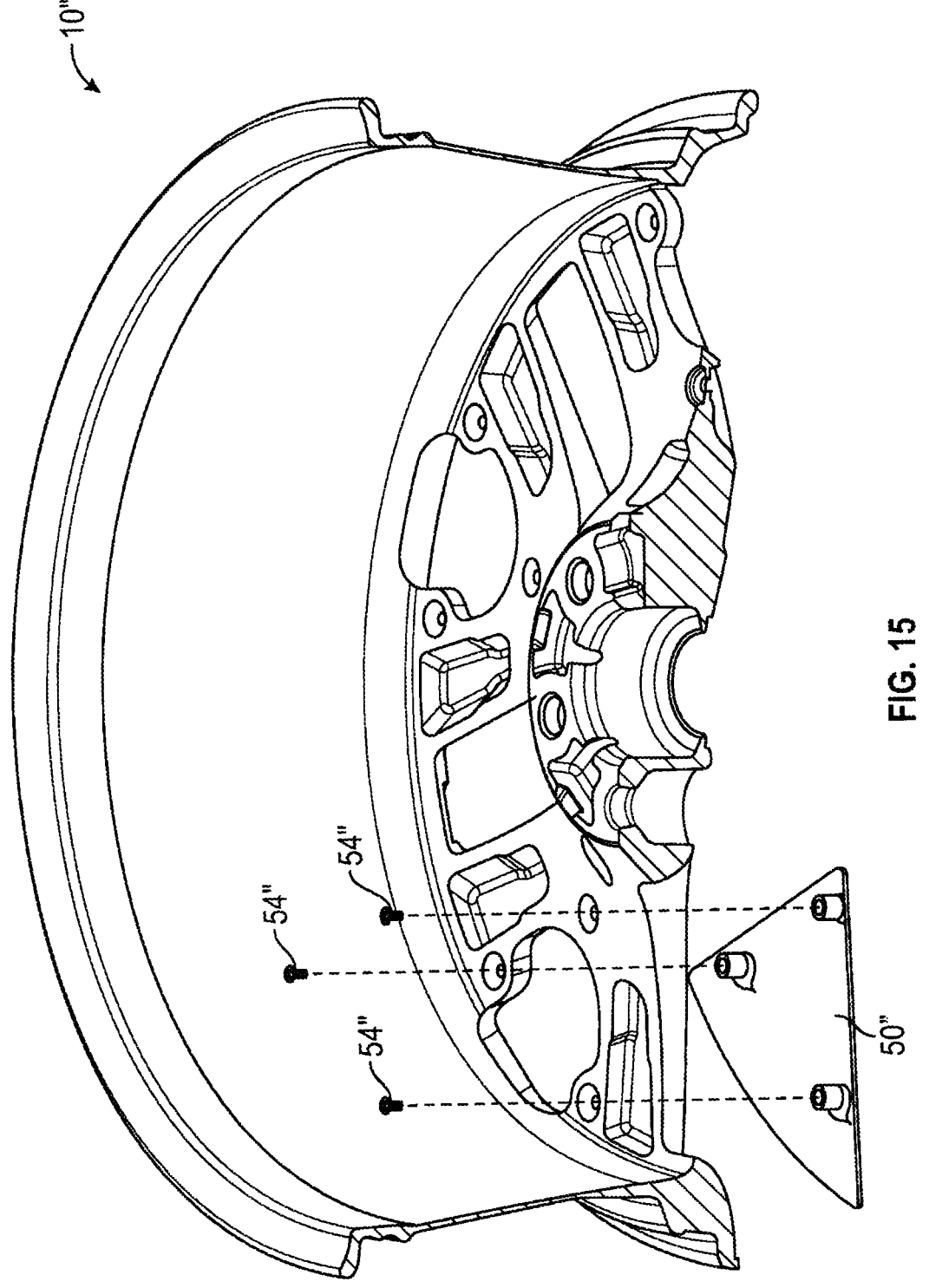
FIG. 15 is a perspective sectional view of an alternate embodiment of a wheel having a trim cover including three separate coupler mounting features.

As stated above, the trim covers 50 may have any suitable shape and may be provided with any number of fasteners for attachment to the wheel 10. There is illustrated in FIG. 15 an alternate embodiment of a wheel 10" illustrating that a differently shaped trim cover 50" uses three separate bolts 54" for attachment to the wheel 10".

Figure 16:
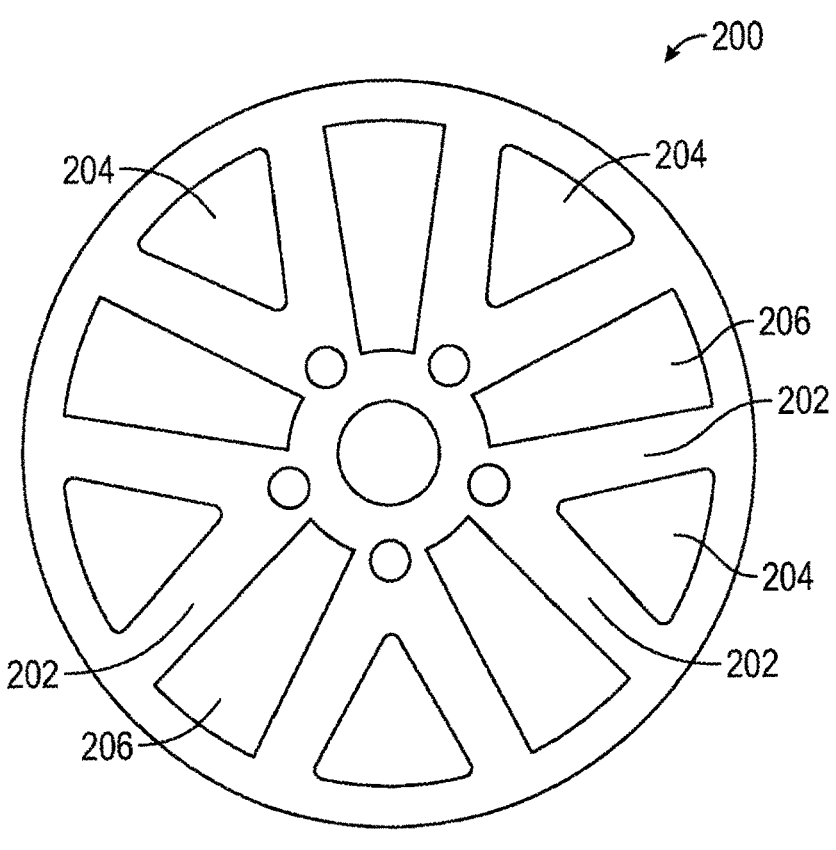
FIG. 16 is a schematic front elevational view of a wheel.

As also stated above, instead of having a plurality of trim covers 50, a single trim cover may be used to cover desired locations of a wheel face. FIGS. 16 through 20 schematically demonstrate the use of a single trim cover per wheel. There is schematically illustrated in FIG. 16 a wheel, indicated generally at 200. The wheel 200 may have any suitable design. In the schematic illustrated embodiment, the wheel 200 includes a plurality of spokes 202 and vent holes 204. The illustrated wheel 200 has a five spoke design including openings 206 formed the spokes 202. Of course, the spokes 202 have any suitable shape and may be formed with the openings 206.

Figure 17:
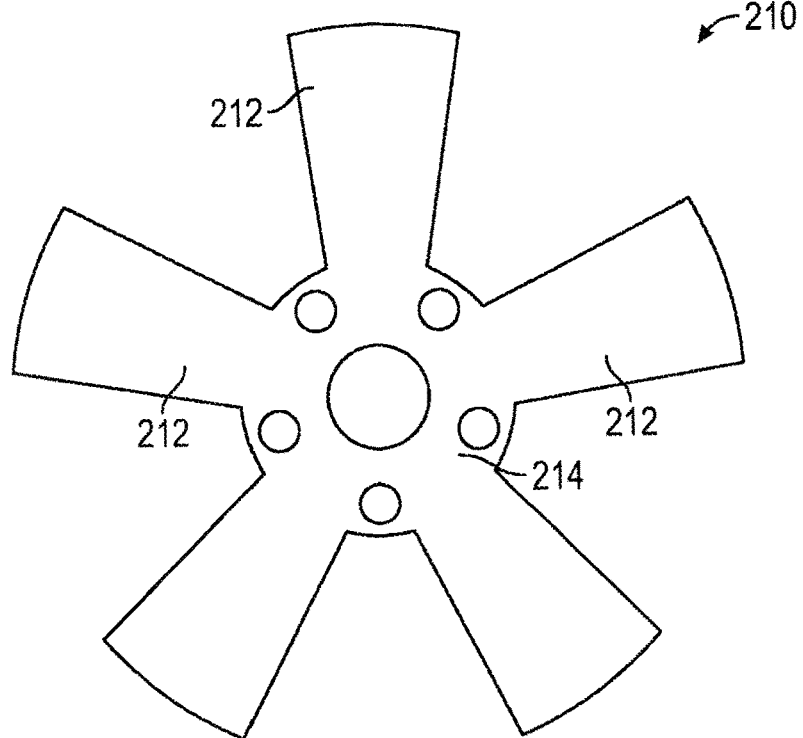
FIG. 17 is a schematic front elevational view of a single piece trim cover.
Figure 18:
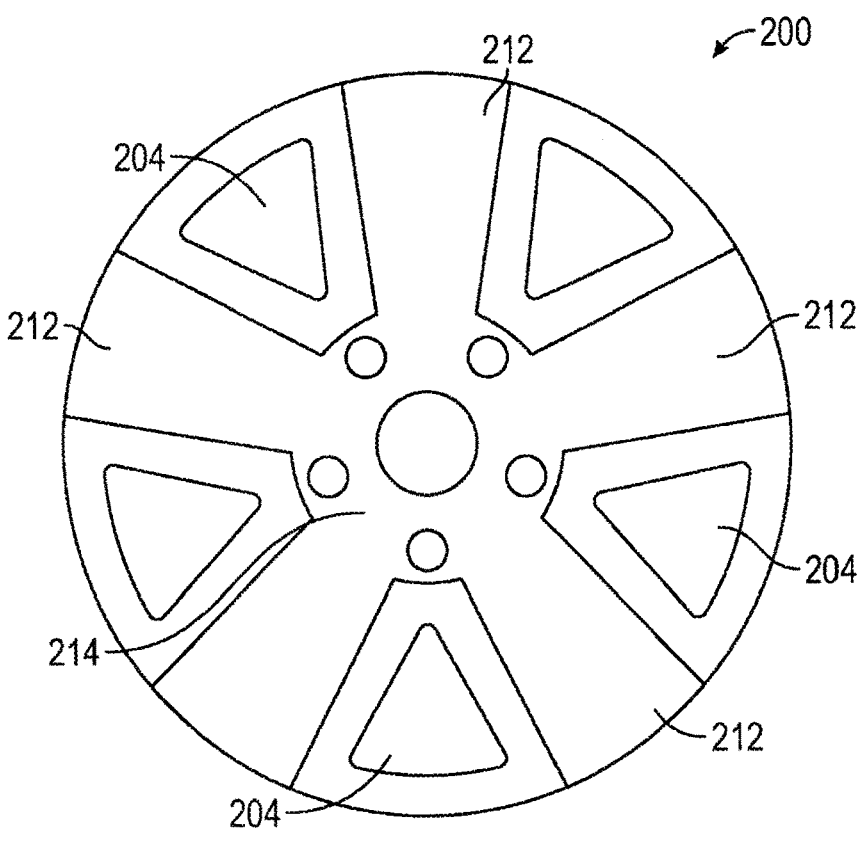
FIG. 18 is a schematical front elevational view of the wheel of FIG. 16 having the single piece trim cover of FIG. 17 installed thereon.

There is schematically illustrated in FIG. 17 a single trim cover, indicated generally at 210, for mating with and installed onto the wheel 200 by the method described above. Thus, the wheel 200 and the trim cover 210 may have mating features (not shown) and couplers (not shown) as described above for attaching the trim cover 210 to the wheel 200. The method of manufacturing using inserts, mold assemblies, and evaluating techniques describe above may be utilized in manufacturing the wheel 200 and trim cover 210. The trim cover 210 includes spoke portions 212 (five shown) extending radially outwardly from a hub 214. Note that outer ends 216 of the spoke portions 212 are not connected together. Of course, the trim cover 210 could be designed such that the outer ends 216 (or any other portions of the trim cover 210) are connected together. FIG. 18 schematically illustrates the trim cover 210 mounted on the wheel 200. The spoke portions 212 of the trim cover 210 generally cover the openings 206 of the spokes 202 of the wheel 200. Of course, the wheel 200 and the trim cover 210 may have suitable design and the spoke portions 212 of the trim cover 210 need not cover the openings 206 of the spokes 202 of the wheel 200.

Figure 19:
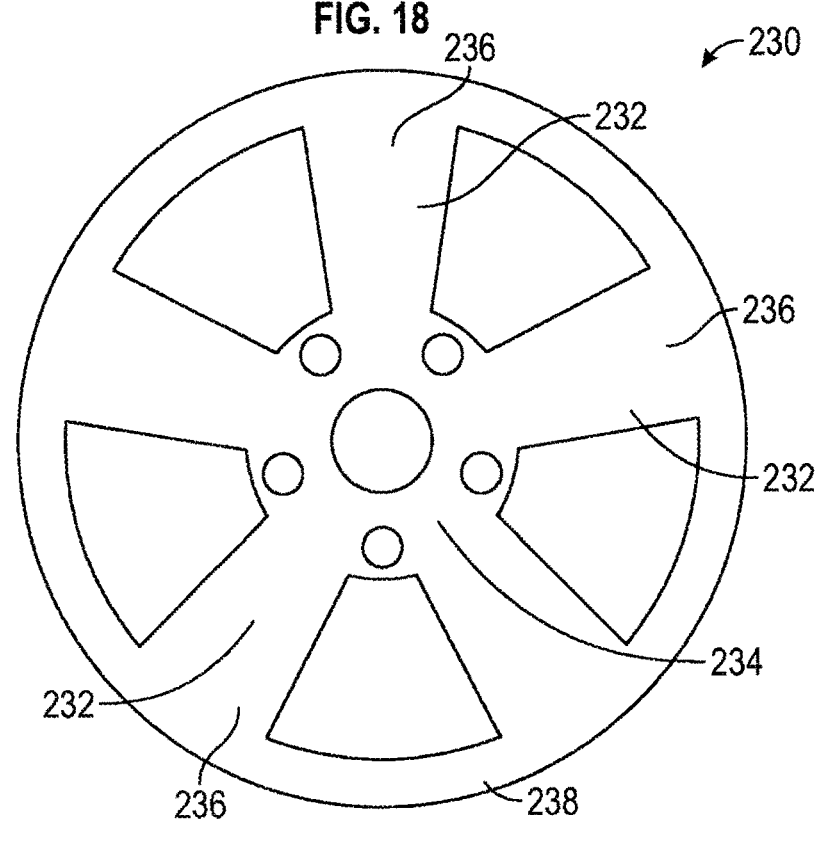
FIG. 19 is a schematic front elevational view of another embodiment of a single piece trim cover.
Figure 20:
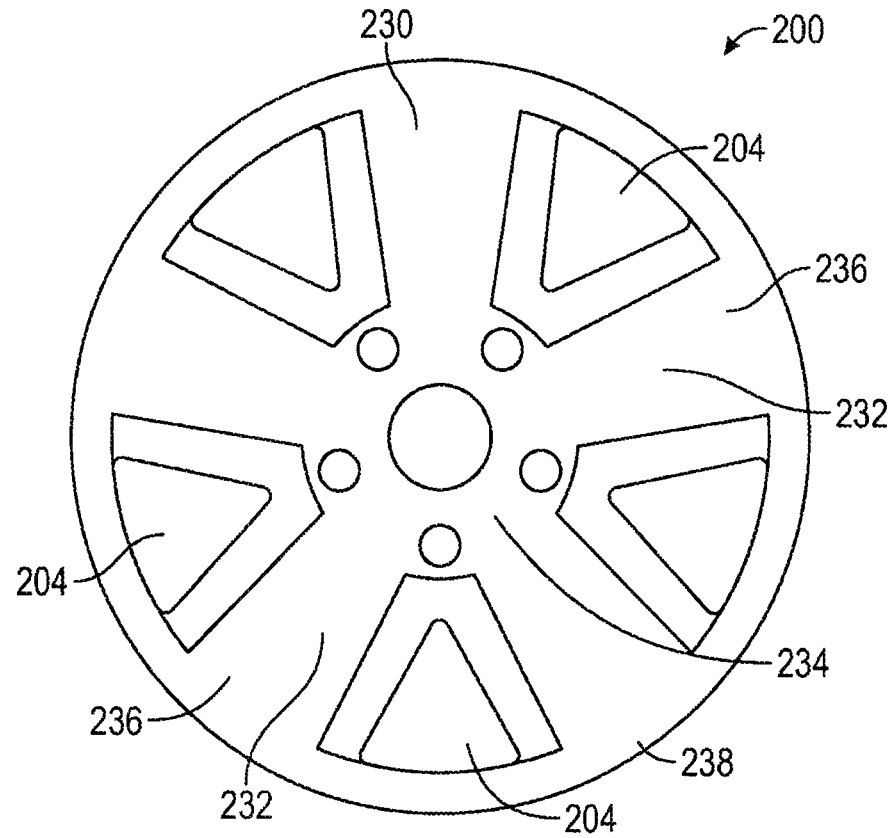
FIG. 20 is a schematic front elevational view of the wheel of FIG. 16 having the single piece trim cover of FIG. 19 installed thereon.

There is schematically illustrated in FIG. 19 another embodiment of a single trim cover, indicated generally at 230, for mating with and installed onto the wheel 200. Similar to the trim cover 210, the trim cover 230 may have mating features (not shown) and couplers (not shown) as described above for attaching the trim cover 210 to the wheel 200. The method of manufacturing using inserts, mold assemblies, and evaluating techniques describe above may be utilized in manufacturing the wheel 200 and trim cover 230. The trim cover 230 includes spoke portions 232 (five shown) extending radially outwardly from a hub 234. The spoke portions 232 have outer ends 236 which are connected to an outer circumferential band 238. The circumferential band 238 can have any suitable width or shape. FIG. 20 schematically illustrates the trim cover 230 mounted on the wheel 200. Similar to the trim cover 210, the trim cover 230 generally covers the openings 206 of the spokes 202 of the wheel 200.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A method of manufacturing a cast vehicle wheel including at least one wheel trim cover attached thereto, wherein the method comprises the steps of:
   (a) providing a wheel mold assembly having a cavity defining a shape of the wheel;
   (b) providing a removable first tool insert adapted to be installed into the mold assembly, wherein the first tool insert includes a mounting feature that communicates with the cavity of the mold assembly to form a mating feature in the wheel when the wheel is cast;
   (c) installing the first tool insert into the mold cavity;
   (d) casting the wheel by introducing a casting material into the cavity of the mold assembly, thereby forming the mating feature in the wheel;
   (e) removing the wheel from the mold assembly;
   (f) providing at least one wheel trim cover adapted to be attached to the wheel at the mating feature of the wheel via a coupler formed in the wheel trim cover such that a relative position of the coupler and the mating feature positions the wheel trim cover relative to the wheel in a first predetermined position;
   (g) optionally attaching the wheel trim cover onto the wheel at a location of the coupler and the mating feature;
   (h) evaluating positional dimensions of the mating feature of the wheel relative to the coupler of the wheel trim cover to determine a positional accuracy of the mounting feature of the first tool insert;
   (i) subsequent to step (h), providing a second tool insert having a second mounting feature dimensionally different from the mounting feature of the first tool insert which provides improved positional accuracy of the wheel trim cover relative to the wheel in a second predetermined position;
   (j) replacing the first tool insert from the mold cavity and installing the second tool insert into the mold assembly;
   (k) casting a second wheel by introducing a casting material into the cavity of the mold assembly; and
   (l) attaching the wheel trim cover onto the second wheel at the location of the coupler and the second mating feature.

2. The method of claim 1, wherein the coupler of the wheel trim cover is in the form of a protrusion, and wherein the mating feature of the wheel is a recess receiving the protrusion when the wheel trim cover is attached to the wheel.

3. The method of claim 2, wherein in step (d) during the casting process, the formation of the profile of the mating feature of the wheel corresponds to the profile of the mounting feature of the first tool insert.

4. The method of claim 1, wherein in step (h) a coordinate measuring machine is used to evaluate positional dimensions of the mating feature of the wheel relative to the coupler of the wheel trim cover to determine a positional accuracy of the mounting feature of the first tool insert.

5. The method of claim 1, wherein in step (l) the wheel trim cover is attached onto the second wheel by at least one fastener, and wherein the fastener is a threaded bolt.

6. The method of claim 5, wherein prior to step (l) a hole is formed in the second wheel at the second mating feature of the second wheel for receiving the threaded bolt.

7. The method of claim 6, wherein the hole is formed by a machining or drilling process after the wheel is cast.

8. The method of claim 6, wherein the hole is formed in the casting process.

9. The method of claim 6, wherein the wheel trim cover is provided with internal threads formed therein for receiving the threaded bolt.

10. The method of claim 9, wherein the coupler of the wheel trim cover is provided with the internal threads.

11. The method of claim 10, wherein the coupler is a protrusion formed in the wheel trim cover.

12. The method of claim 11, wherein the second mating feature of the second wheel is a recess receiving the protrusion of the wheel trim cover.

13. The method of claim 12, wherein the protrusion is cylindrically shaped.

14. The method of claim 13, wherein the recess is cylindrically shaped.

15. The method of claim 1, wherein in step (l) the wheel trim cover is attached onto the second wheel by at least one fastener.

16. The method of claim 1, wherein in step (h), evaluating the positional dimensions of the mating feature of the wheel relative to the coupler of the wheel trim cover includes measuring the position of the mating feature of the wheel relative to the position of the coupler of the wheel trim cover.

17. The method of claim 1, wherein the tool insert includes a keyway which mates with a key portion of the mold assembly to prevent rotation of the tool insert within the mold assembly.

18. The method of claim 1, wherein the coupler of the wheel trim cover includes a distal surface, and wherein the distal surface contacts the wheel when the wheel trim cover is attached to the wheel.

19. The method of claim 1, wherein the coupler of the wheel trim cover includes a distal end, and wherein the distal end is spaced from the wheel when the wheel trim cover is attached to the wheel.

20. The method of claim 1, wherein the wheel mold assembly includes:
   a first portion having a profile defining a front facing disc portion of the wheel;
   a second portion having a profile defining a rear facing disc portion of the wheel; and
   a plurality of side portions having a profile defining a rim portion of the wheel.

21. A cast vehicle wheel produced according to the steps of claim 1.

* * * * *